March 17, 1959  J. H. FORKNER  2,878,127
FOOD MANUFACTURING METHOD AND PRODUCTS
Filed May 16, 1957
FIG_1_
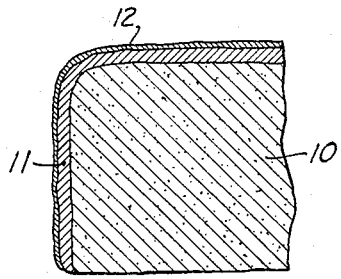
FIG_2_
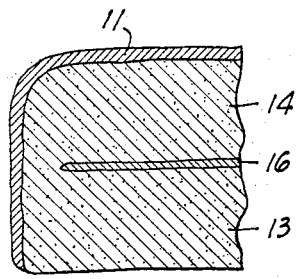
FIG_3_
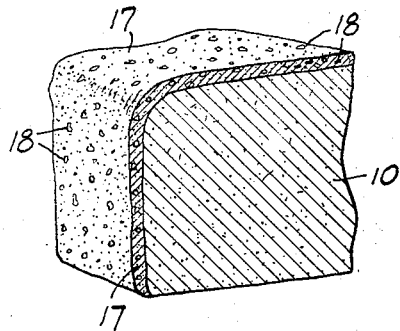
FIG_4_
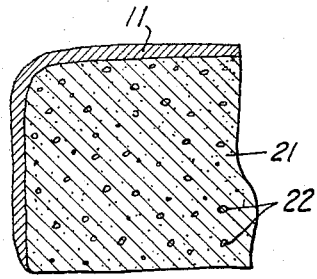
FIG_5_
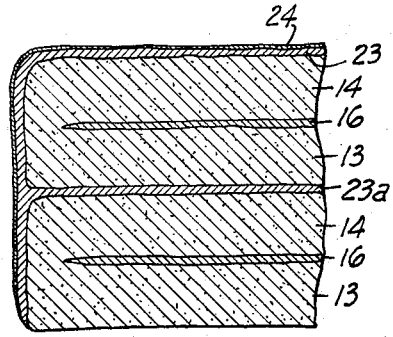
FIG_6_
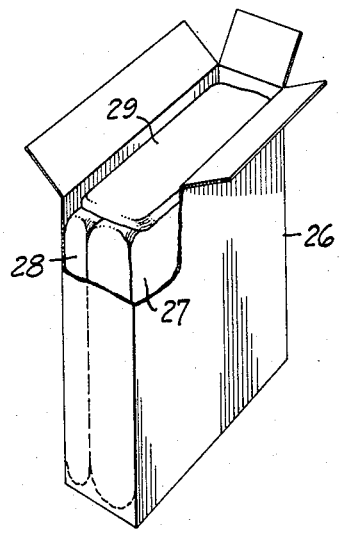
INVENTOR.
John H. Forkner
BY
ATTORNEYS

United States Patent Office 2,878,127
Patented Mar. 17, 1959

2,878,127

FOOD MANUFACTURING METHOD AND PRODUCTS

John H. Forkner, Fresno, Calif., assignor to The Pillsbury Company, a corporation of Delaware Application May 16, 1957, Serial No. 659,569

17 Claims. (Cl. 99—132)

This invention relates generally to food products comprising a gel or jelly as a part of the same, to methods for making such products, and to packaged products for carrying out the method.

In making icings, cakes, cookies and other edible products of the type which at room temperature are in the form of moist solids, it is frequently desirable to provide a mass or distributed masses of flavored jelly having sufficient viscosity or body to retain its identity separate from the other parts of the product. For example, one may wish to apply jelly upon an icing, or as a layer within portions of a cake. In commercial operations it is troublesome to apply a jelly of the desired final viscosity or body to an icing or like surface. The softer gels are easy to apply, but afford a stickiness which makes handling and packaging difficult. Also such gels are not practical for application to cake or like batters, as for example where it is desired to provide a layer of gel in the final baked product. Application of a gel to a layer of the soft batter is impractical because the gel will not retain its identity as a layer during baking, but will lose moisture to the batter, thus causing sogginess of the cake portion. Also such an application will, at least in part, tend to settle out of the batter to the bottom of the pan, during baking.

The present invention is predicated upon my discovery that an aqueous sol of lower ester pectin (e. g. low methoxyl pectin having not more than about 7% methoxyl content) when contacted with a moist material (e. g. icing, cake, etc.) containing a calcium or like divalent metal ion, will rapidly set up as a firm gel. It is well known that the presence of calcium ion promotes gel formation in pectin sols. However the common way to employ calcium ion is to directly introduce a soluble calcium compound into the sol.

In general it is an object of the present invention to provide a novel method for forming edible products including as a part thereof a stable gel or jelly, and which avoids the disadvantages outlined above.

A further object of the invention is to provide a method of the above character wherein gel formation is controlled by and follows rapidly upon contact of a pectin sol with the other part of the product.

Another object of the invention is to provide a method of the above character which greatly facilitates the manufacture of products including jelly as a part (or parts) of the same, and the handling and packaging of the final product.

Another object of the invention is to provide a method of the above character which can be used to provide cakes or like moist products of enhanced attractiveness and edibility.

Another object of the invention is to provide novel food products resulting from use of my method, and which possess advantageous features such as attractive appearance, absence of excessive stickiness, ease of cutting with a knife, ease of packaging, and protection against loss of moisture.

Another object of the invention is to provide a packaged food product capable of being sold as an article of manufacture, and which can be used commercially or by domestic consumers for carrying out the present method.

Additional objects and features of the invention will appear from the following description in which the preferred embodiments have been set forth in detail, in conjunction with the accompanying drawing.

Referring to the drawing:

Figure 1 is a cross sectional detail illustrating a portion of a cake and icing, with a gel applied to the icing.

Figure 2 is a view like Figure 1 but showing a cake having a layer of gel between cake portions.

Figure 3 is a perspective view showing a portion of a cake icing in which small masses of gel have been dispersed.

Figure 4 is a view like Figure 1 showing a cake in which the gel has been dispersed.

Figure 5 is a view like Figure 1 but showing a cake having gel applied to its icing and as layers between cake portions.

Figure 6 is a perspective view showing a package for forming the cake shown in Figure 5.

In accordance with the present invention I employ an aqueous pectin sol capable, upon absorption of divalent calcium ion, of rapidly setting up in the form of a stable gel or jelly. The pectin which I employ is one having calcium sensitivity, or in other words one that is sensitive to the presence of calcium ion insofar as its gel forming characteristics are concerned. In addition I employ a pectin sol that is compatible with the pH resulting from the mild acidity of fruit juices and other flavoring materials that may be employed. Certain so-called low ester pectins have the desired calcium ion sensitivity, and in addition are compatible with many mildly acid materials. Such low ester pectins are manufactured by partial de-esterification by enzymatic action, and by ammonia and alcoholic systems.

In accordance with the present invention I prepare a sol containing low methoxyl pectin, which is supplemented by the addition of sugar or other sweetening, and fruit juices or other flavorings. Assuming the substantial absence of calcium or other divalent metal ion (to which the pectin sol is sensitive) in the fruit juices or other additives, such a sol is relatively stable against setting up in the form of a gel, at ordinary room temperatures, or in any event the time required for gel formation is sufficiently extended as to permit its use in accordance with the present invention.

Calcium ion is provided in that part of the food product to which the pectin sol is contacted. Thus a suitable divalent metal compound (e. g. soluble calcium salt) is provided as one of the ingredients of the confection. This compound should be edible, and completely compatible with the desired properties of the final product. Particularly it should not detrimentally affect palatability or flavor. A variety of soluble calcium salts are suitable for this purpose. For example, I can use such salts as calcium chloride, monobasic, dibasic, and tribasic calcium phosphates, calcium sulphate, and/or calcium citrate. Assuming the use of calcium chloride, a small amount of such salt is used together with other ingredients of a mix whereby it is homogeneously dispersed throughout the entire mass, and is partly if not entirely dissolved in the water content.

The material containing the calcium ion with which the sol is contacted, may be a wet mix, such as a batter, dough or icing mix, or a solidified material, such as a cake after baking or icing after setting. For example, when the material to which the sol is to be applied is an icing that has been applied to a cake, the calcium chloride or like salt is intermixed with the other ingredients of the icing, and when the mix has sufficient viscosity, it is applied over the surface of a cake. The pectin sol is now applied upon the icing as a continuous layer or coating, or as a coating having a predetermined or heterogeneous pattern. Intimate contact of the pectin sol with the icing causes calcium ion to be absorbed from the icing into the pectin sol, with the result that the sol rapidly sets up into the form of a firm gel.

As described in the examples hereinafter set forth the final gel may be distributed as masses in the material containing the calcium ion, as by contacting the pectin sol with a wet mix, followed by interfolding the gel into the mix as the gel proceeds to set. This procedure can be used to advantage to obtain an icing in which small but intact masses of gel are distributed, and which masses may be colored to contrast with the color of the icing mix (e. g. red masses distributed in a white icing).

When the sol incorporates ingredients that are acidic, such as fruit juices, care should be taken to avoid an acidity tending to seriously retard or prevent setting. Thus I prefer to employ fruits or berries (or their juices) that are only mildly acid, such as blueberries, cooked apples, figs, coconut and the like.

In addition to sols containing fruit like flavoring, I can employ ingredients such as cheese or chocolate, which are neutral or relatively low in acidity. The cheese may be of the "cream" or "processed" type, and is employed in such amounts as to provide a material of desired fluidity. The chocolate may contain substantial amounts of sweetening and fat. In both instances some water (or aqueous liquids) should be added for proper gelling action because high moisture and low acid materials are required for the low methoxyl type of calcium sensitive pectin. Care should be taken to insure that such ingredients do not introduce sufficient soluble calcium to cause setting independently of the calcium ion absorbed from the material with which the pectin sol is contacted.

Sols containing oil or fat (i. e. oleaginous) emulsions may also be employed. For example, a commercial type of mayonnaise may be mixed with the pectin sol. The mix may be whipped or aerated by use of a Waring Blendor. Additional ingredients can be used such as a sweetening like sucrose.

Another example of a sol containing a fat emulsion is the use of peanut butter. A suitable edible emulsifying agent (e. g. lecithin) is employed together with the peanut butter, for emulsification of the oil content.

A specific example of my invention is as follows:

Example 1

A pectin sol was prepared containing ingredients as follows:

| | Gms. |
|---|---|
| Granulated sugar (sucrose) | 8 |
| Low methoxyl pectin (exchange pectin #466) | 8 |
| Commercial canned applesauce | 454 |
| Nutmeg | ½ |
| Clove | ½ |
| Mace | ½ |
| Cinnamon | 1 |

Mixture of the above ingredients formed a homogeneous material which could be readily poured from a spoon upon a surface of a cake batter or icing.

A cake icing was prepared from a package of dry ingredients containing calcium chloride. The ingredients and proportioning (dry solids basis) were as follows:

| | Percent (wt.) |
|---|---|
| Dried egg white | 2.94 |
| Salt | 0.15 |
| Cream of tartar | 0.49 |
| Calcium tartrate | 0.15 |
| Corn syrup solids | 17.80 |
| Cellulose gum (through an 80-mesh screen) | 0.26 |
| Pre-gelatinized potato starch | 2.22 |
| Powdered sugar (sucrose) | 75.63 |
| Powdered vanilla (imitation) | 0.36 |
| Total | 100.00 |

The package contained 6½ ounces (wt.) of the above ingredients, together with 1½ grams of calcium chloride.

One half (½) cup (112 ml.) of water was added to the contents of the package to produce a wet mix. The mix was beaten to form a stiff whip for application to a cake. This whip was then applied to the top of a cake in the customary manner. The pectin sol was poured from a spoon upon the top of the icing to cover the major part of the icing surface. At room temperature, and within a time period of about 10 minutes after its application, the sol set up in the form of firm gel. The finished cake had the appearance shown in Figure 1. Part 10 is the main body of the cake, and part 11 the icing containing the calcium ion. The portion 12 is the apple flavored gel which forms a coating upon the icing, and may be of the order of 1/16 of an inch thick. The gel did not have excessive stickness, it was quite palatable and it did not tend to stick to the knife when the cake was cut.

Example 2

A conventional dry powered cake mix was employed, supplemented by the addition of calcium chloride. The formula of the dry mix (dry solids basis) was as follows:

| | Percent (wt.) |
|---|---|
| Cake flour | 40.0 |
| Sugar (bakers special—sucrose) | 42. |
| Emulsified shortening | 11. |
| Egg albumen | 1.26 |
| Spray dried skim milk powder | 3.50 |
| Salt | 0.80 |
| Bicarbonate of soda | 0.60 |
| Pyrophosphate | 0.84 |
| Vanilla flavoring | |
| Total | 100.00 |

Dry powdered calcium chloride was introduced into the above dry mix in the proportions of 1 gram of calcium chloride for each ½ pound of the cake mix solids.

A wet batter was made from the above dry ingredients by mixing the same with water to obtain the desired batter consistency. A cake pan was prepared into which a first portion of the batter was poured. A quantity of pectin sol prepared in accordance with Example 1 was then spooned upon the surface of this layer of batter, whereby substantially all but the margin of the outer area was covered. The remainder of the batter was then poured upon top of the first layer, and the batter cooked (i. e. baked) in the usual way (e. g. 20–24 minutes at 375° F.). After baking, a boiled icing was applied. The finished cake was in accordance with Figure 2. The cake portions 13 and 14 correspond to the two pourings of the batter, and portion 16 is a firm gel produced by the pectin sol. Note that this portion is in the form of a substantially imperforate diaphragm extending between the two cake portions. Shortly after applying the pectin sol to the first pouring of batter, it commenced to set as a gel, and setting continued and was completed during the early stages of baking. No disintegration of the gel occurred during baking, and there was no evidence of absorption of moisture from the gel into the adjacent crumb structure. In other words the adjacent portion 13 of the finished cake was not soggy. The pectin sol set prior to complete baking, and the substantially impervious diaphragm formed maintained an area of demarcation between the upper and lower cake portions, and rose together with rising of the cake. The cake was readily removable from the pan, thus demonstrating that either no substantial amount of sol settled to the bottom of the pan, or that the small amount of sol that did settle, did not cause sticking.

Both icings and pectin sols were prepared in accordance with Example 1. The icing mix was placed in a shallow bowl and then a small amount of the pectin sol (e. g. about 10%) was introduced upon the icing. Within a short time the pectin sol commenced to set. The sol solution, in partially set condition, was then gently folded into the icing mix, thereby providing a mixture comprising the icing together with separately identifiable masses of the gel interspersed therein. After permitting this mixture to stand for a period of about 15 minutes, during which time setting of the sol was completed, the material was applied to the cake thereby providing a composite or aggregate icing comprising small and separately identifiable masses of the gel, interspersed in the icing material. The completed icing was in accordance with Figure 3. Note that the icing 17 in this instance contains the small masses 18 of gel dispersed therein. To provide a more attractive appearance, the pectin sol used for forming this type of icing may contain a suitable coloring material whereby the interspersed masses have a color contrasting with the natural color of the icing.

*Example 4*

A cake batter including calcium chloride was prepared in accordance with Example 2. Before pouring the batter into a pan for baking, a quantity of pectin sol in accordance with Example 1 was added. The proportioning employed was about 10 parts by volume of batter to 1 part by volume of pectin sol. The sol was folded into the cake batter to thereby form a mix comprising a cake batter having an identifiable gel mass dispersed therein. When the sol commenced to set the mixture was deposited into a baking pan, thereby effecting adequate agitation to further disburse the gelled sol particles. This mix was baked in a pan in the usual way. The finished cake, after icing had been applied, was in accordance with Figure 4. The body 21 of the cake contained the interspersed gel masses 22, which enhanced the flavor and general attractiveness.

*Example 5*

A conventional dry pancake mix was supplemented by the addition of calcium chloride in proportions comparable to that used in Example 2. A batter prepared from this mix was poured in the usual way upon a greased cooking surface, and immediately thereafter a sol prepared in accordance with Example 1 applied by spoon to the top surface of the deposited batter. Additional batter was deposited upon top of the sol. Before cooking of the cake portion was completed the deposited sol set to the form of a firm gel without any substantial dilution of the batter. Therefore the completed hotcake comprised cake layers separated by the gel. In addition to making hotcakes in the manner just described, waffles were prepared in the same manner. Thus a quantity of the batter was deposited on a heated waffle iron, a quantity of the sol then applied, and thereafter an additional amount of the batter deposited upon top of the sol. Here again the sol set to the form of a firm gel before cooking of the waffle was completed. In both instances any small amount of pectin sol coming into direct contact with the heated cooking surface did not tend to stick, as would be the case with a conventional high sugar content jelly or jam.

*Example 6*

A pectin sol was prepared from ingredients as follows:

| | Gms. |
|---|---|
| Low methoxyl pectin (exchange pectin #466) | 10 |
| Granulated sugar (sucrose) | 10 |
| Water | 100 |

A cake, provided with a conventional boiled icing, was prepared in accordance with Example 1. The above pectin sol was then sprayed upon the surface of the icing and permitted to set. Within a short time the deposited film set in the form of a gel. The gel imparted an attractive sheen to the icing, and enhanced the keeping properties and shelf life of the cake, particularly in that it inhibited dehydration or loss of moisture to the atmosphere. It materially reduced stickiness of the icing, and facilitated immediate packaging. Also in distribution the gel prevented packaging material from sticking to the icing. The applied gel was quite palatable and did not tend to stick to a knife when the cake was cut. As variations to the procedure just described, the sol may be colored as desired, and it may contain various flavoring ingredients.

*Example 7*

A blueberry sol was prepared containing ingredients as follows:

| | Gms. |
|---|---|
| Water-packed blueberries | 50 |
| Water | 20 |
| Low methoxyl pectin (exchange pectin #466)_gms__ | 4 |
| Granulated sugar (sucrose) | 4 |

In formulating the above ingredients, the granulated sugar was first mixed with the dry powdered pectin. The blueberries were separated from their juice. The sugar and pectin were intermixed with the blueberry juice and water, and thereafter the blueberries were added. The blueberry sol was used in all of the manners outlined in Examples 1 to 5 inclusive.

*Example 8*

A peanut flavored sol was prepared containing ingredients as follows:

| Peanut butter | ozs__ | 16 |
|---|---|---|
| Whole liquid milk | ozs__ | 20 |
| Low methoxyl pectin (exchange pectin #466)_gms__ | | 8 |
| Granulated sugar (sucrose) | gms__ | 8 |

In formulating the above ingredients the pectin, granulated sugar and the milk were first mixed together and then such mixture gradually mixed with the peanut butter. The resulting material had considerable fluidity, and could be readily deposited by pouring upon any desired surface. It was used in the various ways described in Examples 1 to 5 inclusive. A peanut butter sol made in this manner can be modified in various ways, as for example, by the addition of vanilla, caramel, or like flavoring ingredients. Also, it is possible to add a whipping agent, such as an egg albumen, followed by beating to provide an aerated product.

*Example 9*

A chocolate flavored sol was prepared using ingredients as follows:

| Sweet chocolate syrup (Hershey) | oz__ | 16 |
|---|---|---|
| Low Methoxyl pectin (exchange pectin #466)_gms__ | | 8 |
| Granulated sugar (sucrose) | gms__ | 8 |
| Pre-gelatinized starch | oz__ | 1 |

In formulating the above ingredients, the pectin, sugar and starch were mixed with the syrup. This sol was used in all of the ways described in Examples 1 to 5 inclusive.

The cake shown in Figure 5 can be made by combining the procedures described in Examples 1 and 2. Thus duplicate cake portions 13 and 14 are formed with interposed gel 16 as in Example 2, and then the icing 23 applied, together with the interposed icing layers 23a. The gel coating 24 is applied as in Examples 1 or 6.

In instances where the sol is applied to a cake batter before cooking, it is desirable for it to have a consistency or body comparable to that of the batter. For this purpose various body imparting additions can be used, such as pre-gelatinized starch, methyl cellulose, defatted coconut fiber, gums like gum arabic, or the like.

In addition to cakes and icings, the invention can be applied to frozen foods. For example, ¾ grams calcium chloride can be added to 1 pint of ice cream. The applesauce sol of Example 1, or one of the other sols described herein, can be deposited into such ice cream and stirred in whereby calcium ion is absorbed to set the sol as a gel. In commercial operations where the ice cream is being pumped into cartons or containers, the sol may likewise be pumped continuously and deposited into the ice cream as interspersed films or layers.

In all of the foregoing examples a divalent ion is supplied by the introduction of a calcium compound in one part and which is contacted with the sol. In some instances ingredients may be present which contain small amounts of calcium. For example the icing mix to which the sol is applied may contain small amounts of calcium by virtue of the presence of milk solids. Such calcium can be ignored, or if present in appreciable amounts, the amount of soluble calcium salt added can be reduced accordingly. Where ingredients normally containing calcium are incorporated in the sol, the amount of calcium so added should not be sufficient to affect the setting time to a serious extent. In instances where such added calcium may be a serious factor, the ingredients involved may be demineralized by known procedures, as for example, by treatment with ion exchange resins.

Particularly reference has been made to the use of a low methoxyl pectin sol that is sensitive to presence of a divalent metal ion (e. g. calcium). Other pectins may be employed provided they have the desired sensitivity to divalent metal ion and are compatible with the flavoring and other ingredients that may be added. Sodium polypectate possesses such properties. It is obtained from citrus peel by alkaline aqueous extraction under controlled conditions, and may be obtained from The Exchange Orange Products Company of Ontario, California, under the name of Exchange Sodium Polypectate.

It will be evident from the foregoing that my invention has many novel characteristics and advantages. Products made in accordance with the invention have gel portions retaining their identity as such. In instances where the sol is applied before cooking, its use does not cause sticking to the pan or other hot surfaces with which it is in contact. The cakes, icings and other products made in accordance with the present invention have a high degree of palatability and attractiveness, and when cut their is little if any tendency for the gel to stick to the knife, contrary to what is experienced in attempting to cut conventional jelly, jam or marmalade. Whether the gel is used on exposed surfaces of cakes, icings, or the like, the lack of excessive stickiness facilitates packaging in cellophane or other wrappers without adherence of the gel to the wrapper. A particular feature of the invention, mentioned above, is that the gel sets up rapidly after application of the sol to the part which contains calcium ion. During baking this avoids disintegration of the deposited sol, it tends to cause the sol to remain where deposited, and it minimizes interdiffusion between the deposited sol and the adjacent cake or other portions. It permits almost immediate consumption of the final product in the home, and in addition it facilitates quantity production with immediate packaging in commercial establishments.

The foregoing description and in certain of the stated examples, reference is made to applying the sol upon top of a cake icing. It is desirable in this connection to avoid use of an icing containing a relatively high fat content. It is difficult to apply an aqueous sol to the surface of a high fat content icing, because the sol tends to slide off. Also the fat tends to lock in and thus prevents release of calcium ion. Low fat content icings are therefore preferable, as for example, icings containing less than about 10% fat (dry solids basis).

As a part of the present invention, and to facilitate use of the invention by domestic consumers, I prefer to provide a composite package of the type as illustrated in Figure 6. This package consists of an outer carton 26, enclosing the three packages 27, 28 and 29. Package 27 contains a dry cake mix, such as one of the conventional types now being marketed. Package 28 consists of a dry icing mix, likewise such as a mix is now available on the market. However, the contents of package 28 alone, or the contents of both packages 27 and 28, contain additions of calcium chloride in proportions of the order mentioned in the foregoing examples. Package 29 consists of dry powdered ingredients which when mixed with water form a calcium sensitive sol. For example, the ingredients in this package may correspond to the dry ingredients (including pectin) specified for the sol in Example 1.

To carry out the present invention by use of the package shown in Figure 6, the consumer utilizes the ingredients in package 27 to prepare a cake. Package 29 is then mixed with water and flavoring material, as for example a quantity of canned applesauce, as specified in Example 1. The sol thus prepared may be applied to the icing in the manner specified in Example 1, or it may be interfolded with the icing mix in a manner likewise set forth in Example 3. Where the cake prepared contains calcium chloride, procedures can be followed as set forth in Examples 2 and 4.

In some instances, the package shown in Figure 6 may omit the cake mix, and merely include the packages 28 and 29. Such packages are then employed for forming an icing on any cake which the consumer may desire to make.

I claim:

1. In a method of making food products of the type which at normal temperature are in the form of soft moist solids, forming one part of the product with a divalent metal ion and in the form of a soft moist solid, forming another part in the form of an aqueous edible sol containing pectin sensitive to said ion and in fluid form, and contacting the two parts whereby the applied sol absorbs divalent metal ion from the first part to form a separate jelly-like moist solid mass having intersurface engagement with the first part.

2. A method as in claim 1 in which the first part of the product is a cake icing.

3. A method as in claim 1 in which the first part of the product is a cake icing, and in which the second part is applied on the icing to form a separate jelly-like moist solid mass.

4. A method as in claim 1 in which the first part of the product is a cake icing, and in which the second part is interspersed in the first part after setting has commenced, whereby the icing is caused to contain interspersed masses of separately identifiable gel.

5. A method as in claim 1 in which the first part is a cake mix and the second part is contacted with the first part, and thereafter the cake mix heated to cook the same.

6. A method as in claim 1 in which the first part is a cake mix, and in which the second part is contacted with the first part and interspersed therewith after setting has commenced, and thereafter the resulting material heated to an elevated temperature for cooking, whereby the resulting product comprises a cake containing interspersed masses of gel.

7. In a method of making a cake, forming a cake batter containing a divalent metal ion, forming a second part comprising an aqueous edible sol containing pectin sensitive to said ion, depositing a quantity of the cake batter, depositing a quantity of the second part upon the deposited mix, depositing further cake batter upon top of the second part, and thereafter heating the deposited portions to an elevated temperature to effect cooking of the same, the sol absorbing the divalent metal ion from the batter to form a firm gel prior to completing the cooking operation whereby the finished cake has a mass of jelly-like material between cake portions.

8. As a new article of manufacture, a food product comprising one part in the form of a soft moist solid containing a divalent metal ion, and another part in the form of a separately identifiable mass of pectin gel in intimate contact with the first part, and containing the same divalent metal ion which has been absorbed from the first part by contact between the same, said gel being characterized by lack of excessive stickiness, and by absence of any substantial interdiffusion with the first part.

9. An article of manufacture as in claim 8 in which the first part is a cake icing and in which the second part is disposed on the icing.

10. A food product as in claim 8 in which the first part is a cake icing and in which the second part is interspersed in the form of small separately identifiable masses within the icing.

11. A food product as in claim 8 in which the first part is a cake, and in which the second part is interposed between portions of the cake.

12. An article of manufacture as in claim 8 in which the first part is in the form of a baked cake, and the second part is in the form of separately identifiable masses interspersed within the cake.

13. As a new article of manufacture, a package containing dry powdered material including a soluble calcium salt, the ingredients of said package being useable for formulating a soft moist solid food product, and a second package containing a powdered pectin sensitive to calcium ion, said second package being useable for formulating an aqueous edible sol for contact with the first part, whereby the sol absorbs calcium ion from the first part to form a firm gel.

14. An article of manufacture as in claim 13 in which the first package serves to formulate a cake icing, and the second package serves to formulate an edible pectin sol for application to the icing.

15. An article of manufacture as in claim 14 in which the first package contains powdered ingredients useable for formulating a cake mix, and in which the second package is useable to formulate an edible aqueous sol for application to the cake mix.

16. As a new article of manufacture, a composite package containing a package containing a cake icing mix including a soluble calcium compound, a second package containing a dry powdered cake mix useable for formulating a cake batter, and a third package containing a dry pectin sensitive to calcium ion, the third package being useable for formulating a sol for application to the cake icing.

17. An article of manufacture as in claim 16 in which the second package likewise includes a soluble calcium compound.

References Cited in the file of this patent

UNITED STATES PATENTS

| | | |
|---|---|---|
| 2,403,547 | Peschardt | July 9, 1946 |
| 2,420,308 | Gates | May 13, 1947 |
| 2,672,422 | Patterson | Mar. 16, 1954 |
| 2,791,508 | Rivoche | May 7, 1957 |